United States Patent [19]

Schardein et al.

[11] 4,104,136

[45] Aug. 1, 1978

[54] PROCESS FOR APPLYING THIN MOLYBDENUM CONTAINING COATINGS ON ALUMINUM FOR SOLAR ENERGY ABSORPTION

[75] Inventors: Daniel Joseph Schardein; Ruth Diane Lloyd, both of Richmond, Va.

[73] Assignee: Reynolds Metals Company, Richmond, Va.

[21] Appl. No.: 803,320

[22] Filed: Jun. 3, 1977

Related U.S. Application Data

[62] Division of Ser. No. 615,245, Sep. 22, 1974, abandoned.

[51] Int. Cl.$^2$ ............................ C25D 5/44; C25D 9/12
[52] U.S. Cl. ............................... 204/38 B; 204/56 R
[58] Field of Search ............................ 204/56, 38 B

[56] References Cited

U.S. PATENT DOCUMENTS

| 1,923,539 | 8/1933 | Jenny et al. | 204/58 |
|---|---|---|---|
| 2,356,575 | 8/1944 | Frasch | 204/56 |
| 3,639,221 | 2/1972 | Dorsey | 204/58 |
| 3,769,180 | 10/1973 | Gedde | 204/58 |

OTHER PUBLICATIONS

"Electroless Black Magis for Al, Attractive Black Finish for Al and Al Alloys", Bulletin EBMA 773, Mitchell-Bradford Co., Milford, Conn.
"Some Reflection & Radiation Characteristics of Al" by Cyril S. Taylor et al; Housing, Piping, & Air Cond., Jan. 1939, pp. 59–63.
"Bright Anodized Coats for Temp. Control of Space Vehicles" by James H. Weaver, Plating, Dec. 1964, pp. 1115–1172.
Handbook of Chem. & Physics 32nd Ed. 1950–1951, pp. 528–529.
"Coloring of Metals" Metal Finish Guidebook, 1975, pp. 485–486.
Abstract No. 47-0064P of Belgium Pat. No. 815,058. (May 17, 1973).
"Aluma Black, Cold Finish for Al" Birchwood Casey, Div. of Fuller Labs., Eden Prairie, Minn.

*Primary Examiner*—R. L. Andrews
*Attorney, Agent, or Firm*—Glenn, Lyne, Gibbs and Clark

[57] ABSTRACT

A thin, adherent coating is described that is highly absorptive to solar energy and has a low emissivity for thermal energy, thereby being a useful selective surface for solar energy collection. This coating is formed on aluminum and its alloys by a simple electrochemical process and consists of complex aluminum and molybdenum oxides and metallic molybdenum which are deposited as a near-monatomic layer of molybdenum and its oxides. The coating withstands exposure to 400° F (204° C) and 1 hour in boiling water without change in properties.

7 Claims, No Drawings

PROCESS FOR APPLYING THIN MOLYBDENUM CONTAINING COATINGS ON ALUMINUM FOR SOLAR ENERGY ABSORPTION

This is a division, of application Ser. No. 615,245, filed Sep. 22, 1974 now abandoned.

BACKGROUND OF THE INVENTION

This invention relates to solar heating systems and more particularly relates to efficient absorption and retention of solar energy. It especially relates to coatings, to be applied to aluminum surfaces, having high selectivity for solar energy absorption.

The concept of using solar energy as a source of heat is probably as old as mankind itself and the usual procedure was to heat a black surface by the rays of the sun in order to extract heat therefrom.

Solar radiation reaching the surface of the earth is mainly concentrated in the visible spectrum and does not exceed a wave length of about 2 microns. On the other hand, the long-wave thermal radiation spectrum is greater than 3 microns so that there is virtually no overlapping of the shortwave solar spectrum and the longwave thermal spectrum. Because of this rather recent realization, the concept of utilizing selective surfaces for solar collectors has received added attention. Selective surfaces are those whose absorptance and emittance vary with the wave length of the incident radiant energy. Thus, in order to be a good solar collector, a surface exposed to solar radiation must be as little light-reflecting and as little transparent to light as possible; that-is, as dark as possible, preferably black. However, it can generally be stated that the darker a body, the more heat it radiates with increasing temperature, the heat radiation having wave lengths above about 2 or 3 microns. Therefore, the better the receiver is adapted to absorb solar radiation, the greater the energy heat losses by heat radiation with the result that it had not been possible until recently to obtain utilizable energy at high temperature from solar heaters, except by the use of optical systems of high concentration power.

Black paint has long been the most utilized of the non-selective coatings, that is, it is a coating whose absorptance and emittance remains constant over the entire spectrum of thermal and solar waves. Black paint performs reasonably well up to a collector temperature of about 150° C., but above this temperature, its efficiency declines due to thermal losses from re-radiation. Paint also has the serious disadvantage of being an organic material subject to deterioration under normal weather and solar conditions. The main advantage of black paint collectors is their ease of manufacture and low cost.

Recently, there has been made available to the art solar coatings which are quite selective, i.e., materials that have a high absorption for solar radiation and at the same time exhibit very low emissive losses for thermal radiation.

One such coating involves aluminum or an alloy thereof which has been anodized and thereafter blackened by reaction therewith with a copper salt solution. A coating of this type is disclosed in U.S. Pat. No. 2,917,817. This coating is stated to be selective and particularly adapted to be used as a solar collector.

However, there are other physical characteristics of a solar coating which must be taken into consideration aside from its absorptance and emittance characteristics. Thus, a solar coating should be stable. It should not degrade with time and it should be able to be easily reproducible so that it is adaptable for commercial manufacture.

It is precisely in this area that the heretofore employed prior art coatings have suffered serious drawbacks. Thus, for example, it is known in the art that the $\alpha$ and $\epsilon$ characteristics of certain coatings, including aluminum oxide coatings, are directly related to the thickness of the coating. By way of considerable oversimplification, it can be stated that a thick oxide coating is undesirable from the point of view of its $\alpha$ and $\epsilon$ characteristics. However, when using a thin oxide coating produced by anodizing aluminum, severe mechanical properties have arisen, particularly when the necessary blackening solution was employed. A thin anodized layer of aluminum oxide which has been blackened is subject to irregularities in the surface characteristics thereof, thereby detracting from its potential for use as a solar collector.

Relatively hard, porous, adherent, and adsorbent coatings of such metals as copper, silver, and gold have been formed on aluminum by first anodically oxidizing an aluminum article in an electrolyte such as sulfuric acid, chromic acid, or oxalic acid and then depositing completely reduced metal thereon, as disclosed in U.S. Pat. No. 1,988,012. However, lighter colored silver deposits include unreduced or partially reduced metal salts so that the coatings change color when exposed to sunlight.

For present purposes, the term "aluminum" is used with reference to the metal itself and alloys composed predominantly of aluminum, including commercial grades of aluminum with ordinary impurities and normal wrought alloys which may also contain added elements in relatively minor amounts, especially those alloys containing upwards of 90% aluminum by weight.

One measure of the selectivity of a particular surface is the ratio of the shortwave solar absorptance to the longwave thermal emittance. This ratio, however, does not always adequately define the best absorptance-emittance characteristics for a practical solar collector. Thus, for instance, various surfaces of sufficiently low emittance may have high $\alpha/\epsilon$ ratios and yet exhibit only moderate absorptance. It has been found desirable, therefor, to consider the difference factor $(\alpha - \epsilon)$ as an additional indicator.

Among the best state-of-the art solar coatings are black nickel and black chrome, which typically have an $\alpha/\epsilon$ ratio of about 10:1. They are technically quite suitable, but rather expensive to produce. Other surfaces also exhibiting high $\alpha/\epsilon$ ratios sometimes do not have adequate properties to qualify as practical solar coatings. Polished zinc, for example, may have an absorptance of 0.5 and emittance of 0.05, giving an $\alpha/\epsilon$ ratio of 10:1. Similarly, bare aluminum exhibits typical $\alpha/\epsilon$ values up to 15:1 depending on surface condition. Neither of these surfaces has an acceptably high absorptance even though their $\alpha/\epsilon$ ratios are very good.

Absorptance values are conveniently measured using a Gardner Modified Hazemeter with a filter giving the maximum intensity at about 5560 A, the maximum visible wavelength. Emittance may be determined at 300° F., using a Gier Dunkle Total Normal Emittance system.

The natural oxide of aluminum formed on its exposed surfaces is not a desirable attribute for solar heat receptor devices because such surfaces, although having a rather high absorptance/emittance ratio ($\alpha/\epsilon$), tend to exhibit a low absorptance of only about 0.40, i.e., their high $\alpha/\epsilon$ ratio comes about only by virtue of an even lower emittance characteristic. Moreover, the difference ($\alpha-\epsilon$) between their absorptance and emittance is typically less than 0.40.

It has been recognized that absorptance can be increased appreciably (at least doubled) by use of black paint on aluminum surfaces. However, the $\alpha/\epsilon$ ratio obtained is closer to unity, since the emittance of such painted surfaces is about the same as their absorptance.

Other ways have been proposed to solve this problem, in order to be able to exploit other desirable properties of aluminum, especially its good heat conductivity, ease of forming into fabricated articles, and relatively low cost. Perhaps the most successful, although quite costly, is to use plating operations to deposit one or more layers of nickel or other metals of suitable properties.

Thus, for example, nickel on aluminum is effective to achieve a moderate absorptance of about 0.55 and emittance of about 0.15 (or typically $\alpha/\epsilon = 3.7$ and $\alpha-\epsilon = 0.40$); polished zinc on aluminum achieves about the same absorptance and lower emittance, hence a higher $\alpha/\epsilon$ ratio (typically 10:1) but about the same difference ($\alpha-\epsilon$). So-called black nickel and black chrome show higher absorptance (0.87 to 0.88) and low emittance (0.07 to 0.11) for a typical ($\alpha/\epsilon$) ratio of 10.0:1 and a typical $\alpha-\epsilon$ difference of 0.8. Black anodized aluminum has excellent absorptance but relatively high emittance ($\alpha/\epsilon$ about 1.2, with $\alpha-\epsilon$ of only about 0.20). As has heretofore been mentioned, its absorptance and emittance characteristics can be improved only at the expense of its mechanical properties.

From the foregoing, it may be noted that various approaches have been available for increasing absorptance or decreasing emittance, but those able to do both tend to be prohibitively expensive for routine use.

Based on the $\alpha/\epsilon$ parameter, a black nickel coating, mill-finished aluminum, and polished zinc all appear to be suitable and much better than some others. Using the $\alpha-\epsilon$ parameter, however, the relative merits of various surfaces are more readily apparent.

The basic structural elements of apparatus suitable for purposes of the invention are a sheet or panel of relatively high surface area compared to other dimensions, usually having fins or the like to increase the effective area, and means such as tubular conduits formed integrally or otherwise disposed in heat exchange relationship therewith for transmitting fluid to extract heat. The fluid used is normally water or an aqueous solution of lower freezing point, but it may also be a gas such as air.

For purposes of background information on related aspects of solar heat collection, reference is made to "Low Temperature Engineering Application of Solar Energy," published by American Society of Heating, Refrigerating and Air-Conditioning Engineers, Inc. (especially Chapter IV on Selective Surfaces for Solar Collectors); and, on the subject of chemical oxide coatings for aluminum to "The Surface Treatment and Finishing of Aluminum and its Alloys," by Wernick and Pinner. 1959, published by Robert Draper Ltd. (especially section 5 on Chemical Conversion Coatings, beginning at page 166).

DESCRIPTION OF THE PREFERRED EMBODIMENTS

The process of this invention produces a thin, adherent coating on aluminum and its alloys that is highly absorptive to solar energy and has a low emissivity for thermal energy. It is, in other works, a selective surface having a high ratio ($\alpha/\epsilon$) of short-wave solar absorptance to long-wave thermal emittance; it also has a high difference factor ($\alpha-\epsilon$). Aluminum and aluminum alloys having the coating of this invention are thus highly useful as collector surfaces in solar collectors for heating and cooling homes and other buildings.

This coating consists of complex aluminum and molybdenum oxides and metallic molybdenum as a near-monatomic layer of molybdenum which is deposited along with these oxides. Molybdenum exhibits the phenomenon of "self-polarization;" that is, it will not deposit on itself, so that as soon as a monatomic layer is formed, deposition ceases unless depolarization comes about through simultaneous deposition of another metal or by the formation of an alloy with the cathode.

In order to produce coatings having a selected thickness, whereby the absorptance and emittance of selected wavelengths of light and of heat radiation can be respectively controlled, depolarizers such as nickel may be added to the molybdenum electrolyte. Coatings with increased resistance to severe heat and humidity are produced by utilizing an immersion zinc coating prior to the molybdenum coating. Likewise, zinc, when present in the alloy, tends to stabilize the black molybdenum coating against change resulting from severe heat and humidity.

The process of this invention comprises electrochemically plating a clean aluminum surface in a solution containing ammonium molybdate at room temperature. A satisfactory solution is slightly alkaline and contains $MoO_3$, and $NH_4OH$. A cleaned aluminum surface, immersed for a few minutes at low current density, produces a coating on the aluminum having high absorptivity and low emissivity at elevated temperatures.

Time, temperature, and current density are not critical because the coating tends to be self-limiting in thickness due to the self-polarization of molybdenum. Thereafter, the rate of deposition rapidly declines. As a result, a near-monatomic layer of molybdenum is deposited along with this oxide. This feature insures constant, reproducible results. The coating withstands exposure to 400° F and one hour in boiling water without change in properties.

Time and current density are interrelated in that a high current density requires less time and low current density requires a longer time to achieve an acceptable absorptance. Plating should be stopped after an acceptable absorptance has been obtained because even though the coating tends to be self-limiting, there is some additional deposition on prolonged treatment that tends to increase the emittance. Acceptable coatings have been produced at current densities from 2 to 12 amperes per square foot and at coating times from 1 to 6 minutes.

The ammonium molybdate used may be either the commercially prepared ammonium molybdate or can be formed in situ from molybdenum oxide and ammonium hydroxide. The solution pH can be from acid to highly alkaline; however, the preferred range is 8-10. The solution temperature seem to have no effect on the formation of the coating, and room temperature is used only for convenience. The concentration of the molybdate solution is not critical. Successful coatings have been formed in solutions containing only 7.5 grams/liter $MoO_3$ and 5 ml/l $NH_4OH$.

This process is effective on aluminum and aluminum-alloy articles having substantial thickness and is also useful on thin aluminum sheets and on aluminum foils for solar heating applications such as those described in U.S. Pat. No. 3,129,703.

EXAMPLE 1

A cleaned aluminum article was plated by immersing it with power on as the cathode in a solution at room temperature for two minutes at 3 amperes per square foot. The solution contained ammonium molybdate made up with 30 grams/liter of $MoO_3$ and 20 ml/liter of $NH_4OH$ at pH 9.

The coating on the aluminum article was tested on the Gardner-Reynolds Modified Hazemeter and the Gier Dunkle Total Normal Emittance System and found to have an absorptance for visible light of 0.913 and on emittance at 300° F of 0.158, the $\alpha/\epsilon$ ratio thus being 5.8 and the $\alpha - \epsilon$ difference being 0.75. This coating was subjected to boiling water for 1 hour after which the absorptance was found to be 0.924 and the emittance 0.143, giving an $\alpha/\epsilon$ ratio of 6.5 and a $\alpha - \epsilon$ difference of 0.781. The coating was extremely thin, and examination by ISMA (Ion Beam Surface Mass Analyzer) showed it to be composed mainly of molybdenum and molybdenum oxide.

The aluminum article was then immersed in boiling water for 1 hour and again tested; its absorptivity and emissivity properties were unchanged. The article was placed in an oven at 400° F for 1 hour. When exposed to solar radiation, its properties were again found to be unchanged.

EXAMPLE 2

A similar cleaned aluminum article was immersed in the same solution at room temperature for 3.5 minutes at 3 amperes per square foot. The plating rate was observed to rapidly decline as evidenced by increasing gassing at the cathode, after about 2 minutes plating.

The article was tested for solar absorption and thermal emittance and was found to have substantially the same absorptivity and emissivity as in Example 1. The coating was also found to be substantially monatomic in thickness.

EXAMPLE 3

A cleaned aluminum article was given a standard double zincate immersion coating, as commonly practiced in the plating industry, and then plated in a solution containing 30 g/l $MoO_3$ and 20 ml/l $NH_4OH$ at room temperature and at pH 9, for 2 minutes at 3.5 amperes per square foot. Upon testing, the properties of this coating were 0.913 absorptance and 0.2 emittance. After 1 hour in boiling water, the specimen was retested and found to have 0.906 absorptance and 0.182 emittance.

EXAMPLE 4

Small solar collector modules were prepared for testing in a desert location. Test coupons were run with each module. The electrolyte used was made up with 30 grams per liter of commercially available ammonium molybdate with the pH adjusted to 9.0 with $NH_4OH$.

Module 1 was cleaned and then plated for 3 minutes at 3 amperes per square foot. The test coupon showed an absorptance of 0.913 and on emittance of 0.136.

Module 2 was cleaned, given the standard double zincate treatment, and then plated for 1.5 minutes at 3 amperes per square foot. The test coupon showed properties of 0.906 absorptance and 0.182 emittance.

Because it will be readily apparent to those skilled in the art that innumerable variations, modifications, applications, and extensions of these embodiments and principles can be made without departing from the spirit and scope of the invention, what is herein defined as such scope and is desired to be protected should be measured, and the invention should be limited, only by the following claims.

What is claimed is:

1. The process of producing a thin, adherent coating on an article of aluminum and alloys thereof that is highly absorptive to solar energy and has a low emissivity for thermal energy, said process comprising:
   A. providing a clean surface on said article;
   B. immersing said surface in a solution containing ammonium molybdate;
   C. connecting said article as the cathode in a direct-current circuit; and
   D. electrochemically plating said clean surface to form a coating which is a nearmonatomic layer of molybdenum and oxides thereof.

2. The process of claim 1 wherein said solution is slightly alkaline and contains $MoO_3$ and $NH_4OH$.

3. The process of claim 2 wherein an immersion zinc coating is deposited prior to said plating.

4. The process of claim 3 wherein nickel salts are added to said solution as depolarizers prior to said plating, whereby coatings of selected thickness are produced.

5. The process of claim 2 wherein said solution consists of 30 grams of liter of $MoO_3$ and 20 milliliters per liter of $NH_4OH$ at pH 9.

6. The process of claim 2 wherein said article is immersed in said solution for 1-6 minutes at low current density.

7. The process of claim 2 wherein said current density is about 2-12 amperes per square foot.

* * * * *